United States Patent
Itoh et al.

(10) Patent No.: US 11,897,477 B2
(45) Date of Patent: Feb. 13, 2024

(54) CONTROL DEVICE FOR VEHICLE, CONTROL METHOD, NON-TRANSITORY COMPUTER-READABLE STORAGE MEDIUM, MANAGER, AND VEHICLE

(71) Applicants: TOYOTA JIDOSHA KABUSHIKI KAISHA, Toyota (JP); ADVICS CO., LTD., Kariya (JP)

(72) Inventors: Nobuyuki Itoh, Toyota (JP); Shogi Fukukawa, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 49 days.

(21) Appl. No.: 17/569,003

(22) Filed: Jan. 5, 2022

(65) Prior Publication Data
US 2022/0219702 A1      Jul. 14, 2022

(30) Foreign Application Priority Data
Jan. 14, 2021   (JP) ................. 2021-004377

(51) Int. Cl.
*B60W 30/20*   (2006.01)
*B60W 30/18*   (2012.01)

(52) U.S. Cl.
CPC ...... *B60W 30/20* (2013.01); *B60W 30/18072* (2013.01); *B60W 2030/1809* (2013.01); *B60W 2030/203* (2013.01); *B60W 2510/0614* (2013.01); *B60W 2510/1005* (2013.01)

(58) Field of Classification Search
CPC ........... B60W 30/20; B60W 30/18072; B60W 2030/1809; B60W 2030/203; B60W 2510/0614; B60W 2510/1005; B60W 30/143; B60W 2720/106; B60W 2720/30; Y02T 10/60
USPC ........................................... 701/103
See application file for complete search history.

(56) References Cited

U.S. PATENT DOCUMENTS

2020/0070802 A1*   3/2020  Yamada ................ B60W 10/20
2020/0247385 A1*   8/2020  Nonami .............. B60W 30/085

FOREIGN PATENT DOCUMENTS

| JP | 2005-146953 A | 6/2005 |
| JP | 2013-096518 A | 5/2013 |
| JP | 2020-32892 A  | 3/2020 |

* cited by examiner

*Primary Examiner* — Scott A Reinbold
(74) *Attorney, Agent, or Firm* — Oliff PLC

(57) ABSTRACT

A control device installed in a vehicle comprising an electronic control unit configured to: accept a plurality of first requests from a driving assistance system; arbitrate the first requests; calculate a second request that is a physical amount that differs from the first requests based on a result of arbitration in which the first requests are arbitrated; and distribute the second request to at least one of a plurality of actuator systems, wherein the electronic control unit is configured to, when there is the first request requesting a driving force exceeding a first driving force necessary for recovery from a fuel cut state, perform arbitration such that an actual driving force generated by the vehicle is no greater than the first driving force, until reaching a driving force lower limit realizable by a powertrain actuator included in the actuator system at a current gear ratio.

8 Claims, 3 Drawing Sheets

CONTROL DEVICE FOR VEHICLE, CONTROL METHOD, NON-TRANSITORY COMPUTER-READABLE STORAGE MEDIUM, MANAGER, AND VEHICLE

CROSS-REFERENCE TO RELATED APPLICATION

This application claims priority to Japanese Patent Application No. 2021-004377 filed on Jan. 14, 2021, incorporated herein by reference in its entirety.

BACKGROUND

1. Technical Field

The present disclosure relates to a control device for vehicle, a control method, and a non-transitory computer-readable storage medium, a manager and a vehicle.

2. Description of Related Art

Regarding a control device that is capable of executing coasting control in which a clutch is disengaged while a vehicle is traveling and coasting is performed, and fuel cut control in which supply of fuel to an engine is reduced, Japanese Unexamined Patent Application Publication No. 2013-096518 (JP 2013-096518 A) discloses technology for suppressing shock due to disengaging the clutch while the vehicle is traveling. This control device described in JP 2013-096518 A disengages the clutch after torque fluctuation on a drivetrain has converged at the time of starting coasting control, thereby suppressing shock such as vibrations due to torque fluctuation from occurring in the vehicle.

SUMMARY

When transitioning fuel cut from an implemented state to a non-implemented state in accordance with a request from a driving assistance system or the like, time is required for actual driving force that is driving force actually being generated in the vehicle to begin to follow a driving force lower limit that is the driving force that a powertrain actuator is capable of realizing at the current gear ratio.

When there is a request from the driving assistance system or the like for driving force exceeding the driving force lower limit of the powertrain actuator until the actual driving force of the vehicle begins to follow the driving force lower limit of the powertrain actuator, twisting of the driveshaft may cause vibrations and sound, particularly in vehicles with long driveshafts.

The present disclosure has been made in light of the above problem, and it is an object thereof to provide a control device and so forth that is capable of suppressing the driveshaft from twisting and causing vibrations and sound.

An aspect of the present disclosure relates to a control device installed in a vehicle, the control device comprising an electronic control unit configured to: accept a plurality of first requests from a driving assistance system; arbitrate the first requests; calculate a second request that is a physical amount that differs from the first requests based on a result of arbitration in which the first requests are arbitrated; and distribute the second request to at least one of a plurality of actuator systems, wherein the electronic control unit is configured to, when there is the first request requesting a driving force exceeding a first driving force necessary for recovery from a fuel cut state, perform arbitration such that an actual driving force generated by the vehicle is no greater than the first driving force, until reaching a driving force lower limit realizable by a powertrain actuator included in the actuator system at a current gear ratio.

According to the control device of the present disclosure, no requests for driving force exceeding the driving force lower limit occur until the actual driving force of the vehicle begins to follow the driving force lower limit of the powertrain actuator, and accordingly twisting of the driveshaft causing vibrations and sound can be suppressed.

Another aspect of the present disclosure relates to a manager installed in a vehicle, the manager including: an accepting unit that accepts a plurality of kinematic plans from a plurality of advanced driving-assistance system applications; an arbitrating unit that arbitrates the kinematic plans; a calculating unit that calculates a motion request based on arbitration results by the arbitrating unit; and a distributing unit that distributes the motion request to at least one of a plurality of actuator systems, wherein when there is the kinematic plan requesting a driving force exceeding a first driving force necessary for recovery from a fuel cut state, the arbitrating unit performs arbitration such that an actual driving force generated by the vehicle is no greater than the first driving force, until reaching a driving force lower limit realizable by a powertrain actuator included in the actuator system at a current gear ratio.

Another aspect of the present disclosure relates to a control method executed by a computer of a manager installed in a vehicle, the control method including: accepting a plurality of kinematic plans from a plurality of ADAS applications; arbitrating the kinematic plans; calculating a motion request based on arbitration results from the arbitrating; and distributing the motion request to at least one of a plurality of actuator systems, wherein when there is the kinematic plan requesting a driving force exceeding a first driving force necessary for recovery from a fuel cut state, in the arbitrating, arbitration is performed such that an actual driving force generated by the vehicle is no greater than the first driving force, until reaching a driving force lower limit realizable by a powertrain actuator included in the actuator system at a current gear ratio.

Another aspect of the present disclosure relates to a non-transitory computer-readable storage medium storing a program that is executable by a computer of a manager installed in a vehicle and that causes the computer to perform functions including: accepting a plurality of kinematic plans from a plurality of ADAS applications; arbitrating the kinematic plans; calculating a motion request based on arbitration results from the arbitrating; and distributing the motion request to at least one of a plurality of actuator systems, wherein when there is the kinematic plan requesting a driving force exceeding a first driving force necessary for recovery from a fuel cut state, in the arbitrating, arbitration is performed such that an actual driving force generated by the vehicle is no greater than the first driving force, until reaching a driving force lower limit realizable by a powertrain actuator included in the actuator system at a current gear ratio.

Another aspect of the present disclosure relates to a vehicle, wherein the control device of the present disclosure is installed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When there is a request for driving force exceeding a driving force necessary to recover from a fuel cut state in a vehicle that is implementing fuel cut and that is coasting, a control device according to the present disclosure performs arbitration based on a driving force lower limit that can be realized by a powertrain actuator with the accelerator fully open at the current gear ratio (availability lower limit). Twisting of the driveshaft causing vibrations and sound can be suppressed according to this arbitration control. Hereinafter, an embodiment of the present disclosure will be described in detail with reference to the drawings.

Embodiment

Configuration

Figure 1:
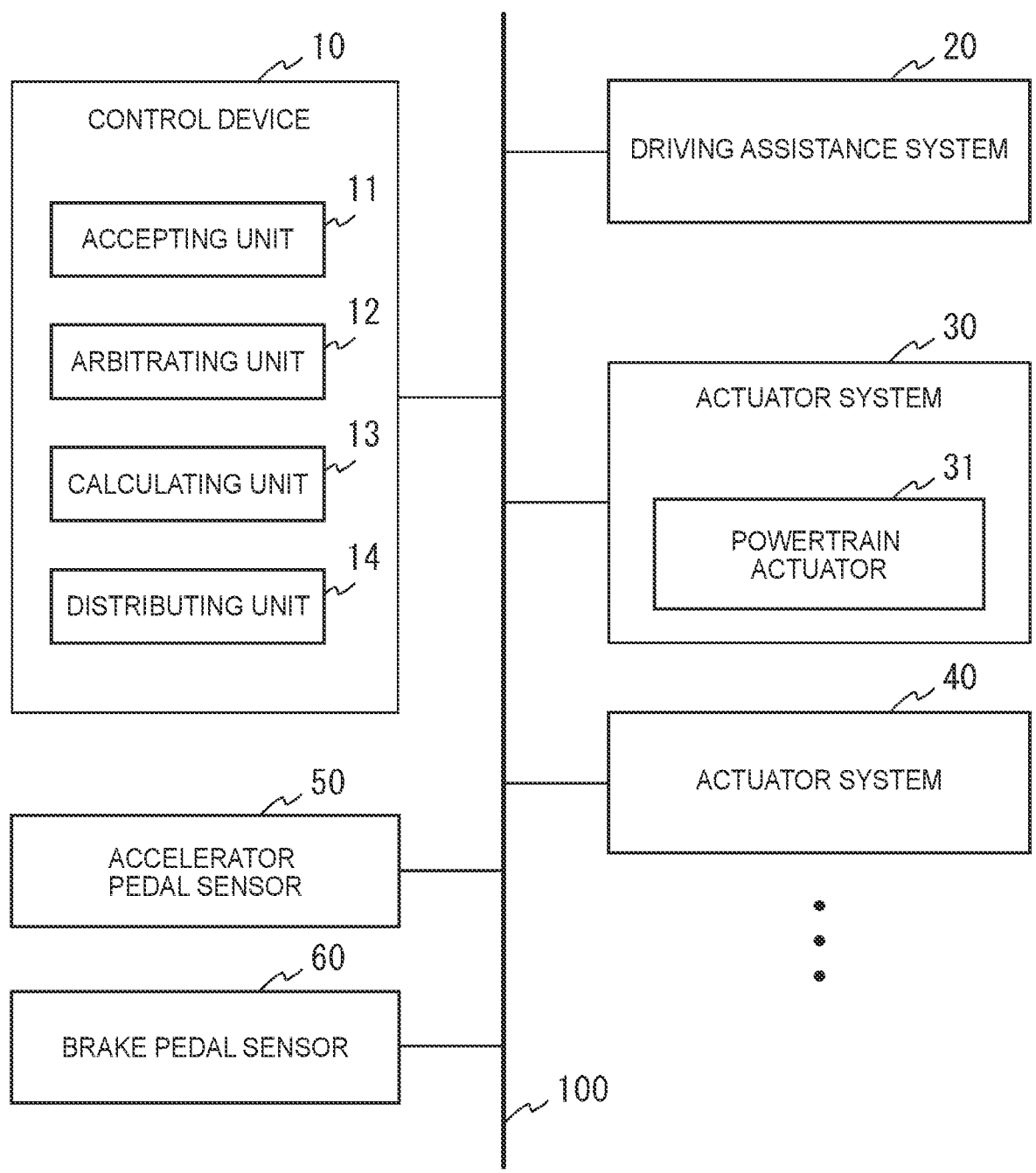
FIG. 1 is a configuration diagram of a control device according to an embodiment of the present disclosure and proximity portions thereof.

FIG. 1 is a diagram illustrating a configuration of a control device 10 installed in a vehicle according to an embodiment of the present disclosure, and proximity portions thereof. The control device 10 illustrated in FIG. 1 is communicably connected to a driving assistance system 20, a plurality of actuator systems 30 and 40, an accelerator pedal sensor 50, and a brake pedal sensor 60, via an in-vehicle network 100. Examples of the in-vehicle network 100 include a Controller Area Network (CAN), Ethernet (a registered trademark), and so forth.

The driving assistance system 20 is configured to realize various functions for assisting driving of the vehicle by executing predetermined applications, including at least drive control and braking control of the vehicle. Examples of applications implemented in the driving assistance system 20 include an automated driving application that realizes automated driving functions, an automated parking application that realizes automated parking functions, an advanced driving-assistance application, and so forth. The advanced driving-assistance application includes a plurality of advanced driving-assistance system (ADAS) applications, such as an application that realizes adaptive cruise control (ACC) functions in which a vehicle traveling ahead is followed, an application that realizes lane keeping assistance (LKA) functions in which lane maintaining is performed, an application that realizes collision mitigation braking (autonomous emergency braking (AEB)) functions to reduce damage in a collision, and so forth. The driving assistance system 20 outputs requested kinematic plans (forward/reverse acceleration/deceleration, etc.) guaranteeing functionality (merchantability) of the application alone, based on information of the vehicle acquired from various types of sensors and so forth that are omitted from illustration.

The driving assistance system 20 is realized by a computer, such as an electronic control unit (ECU) that has a processor such as a central processing unit (CPU), memory, and an input/output interface. Note that the number of applications implemented in the driving assistance system 20 is not limited in particular. Also, an individual ECU may be provided for each of the applications, as the driving assistance system 20. Also, an automated driving ECU in which the automated driving application is implemented, an automated parking ECU in which the automated parking application is implemented, and an ADAS-ECU in which the advanced driving-assistance application is implemented, for example, may make up the driving assistance system 20. Further, the ADAS applications may be implemented in a plurality of devices, such as an ECU in which an ADAS application that realizes ACC functions is implemented, an ECU in which an ADAS application that realizes LKA functions is implemented, an ECU in which an ADAS application that realizes AEB functions is implemented, and so forth.

The actuator systems 30 and 40 are one of realizing systems for realizing kinematic plan requests that the driving assistance system 20 outputs. The actuator system 30 includes a powertrain actuator 31 that is capable of generating driving force in the vehicle, and realizes kinematic plan requests by controlling actions of the powertrain actuator 31. Examples of the powertrain actuator 31 include an engine, a transmission (T/M), and so forth. Note that examples of the actuator system 40 and other actuator systems include a brake actuator and a steering actuator (omitted from illustration).

The accelerator pedal sensor 50 is a configuration to detect an operation amount that is a depressing amount of an accelerator pedal operated by the driver of the vehicle. This accelerator pedal sensor 50 is attached to a vehicle accelerator mechanism or the like.

The brake pedal sensor 60 is a configuration to detect an operation amount that is a depressing amount of a brake pedal operated by the driver of the vehicle. This brake pedal sensor 60 is attached to a brake mechanism or the like of the vehicle.

The control device 10 decides control contents relating to braking/driving motions of the vehicle, based on kinematic plan requests accepted from the driving assistance system 20 and the operation amounts acquired from the accelerator pedal sensor 50 and the brake pedal sensor 60, and performs control by giving instructions relating to necessary braking/driving to the actuator systems 30 and 40 based on the control contents that have been decided. This control device 10 functions as a so-called manager relating to motion of the vehicle (ADAS-Manager, Vehicle-Manager, etc.), or as part of a manager, and controls movement of the vehicle. The control device 10 includes an accepting unit 11, an arbitrating unit 12, a calculating unit 13, and a distributing unit 14, which are implemented by a processor or a computer such as an electronic control unit executing a program.

The accepting unit 11 accepts kinematic plan requests output from one or a plurality of the applications of the driving assistance system 20. The kinematic plan requests according to the present embodiment are also a first request for calculating a motion request, requesting the vehicle for braking/driving force corresponding to speed change output from the ADAS application or the like that provides ACC functions in which a vehicle traveling ahead is followed, for example. Examples of kinematic plans include acceleration in the front-rear direction (longitudinal direction) of the vehicle, and so forth.

The arbitrating unit 12 arbitrates a plurality of first requests that the accepting unit 11 has accepted from the driving assistance system 20. Examples of arbitration processing include selecting one braking request from a plurality of braking requests based on a predetermined selection reference, and setting a new braking request based on the braking requests. The arbitrating unit 12 also performs arbitration based on a driving force lower limit that can be realized by the powertrain actuator 31 in a state with the accelerator fully open at the current gear ratio (availability lower limit), when the vehicle is determined to be in a predetermined traveling state based on operation amounts and so forth acquired from the accelerator pedal sensor 50 and the brake pedal sensor 60. The predetermined traveling state in the present embodiment is a state of traveling while transitioning fuel cut (F/C), which is control in which supply of fuel to an engine is reduced, from an implemented state to a non-implemented state (hereinafter referred to as "fuel-cut recovery").

The calculating unit 13 calculates a second request for a physical amount that differs from the first request, based on the arbitration results of the first requests by the arbitrating unit 12. This second request is a physical amount for controlling the actuator systems 30 and 40. For example, when the first request is acceleration, driving force can be calculated as the second request. Thus, a request for acceleration is converted into a request for driving force.

The distributing unit 14 distributes the second request calculated by the calculating unit 13 to the actuator systems 30 and 40 as a motion request. Note that the driving force for the second request may be driving torque. Also, conversion from driving force to driving torque may be performed at the actuator systems 30 and 40.

Note that the configuration of the equipment installed in the vehicle and the configuration of the control device 10 that are described above are exemplary, and additions, substitutions, modifications, omissions, and so forth can be made as appropriate. Also, the functions of each of the pieces of equipment can be implemented as appropriate by being integrated into one piece of equipment, or by being distributed among a plurality of pieces of equipment.

Control

Figure 2:
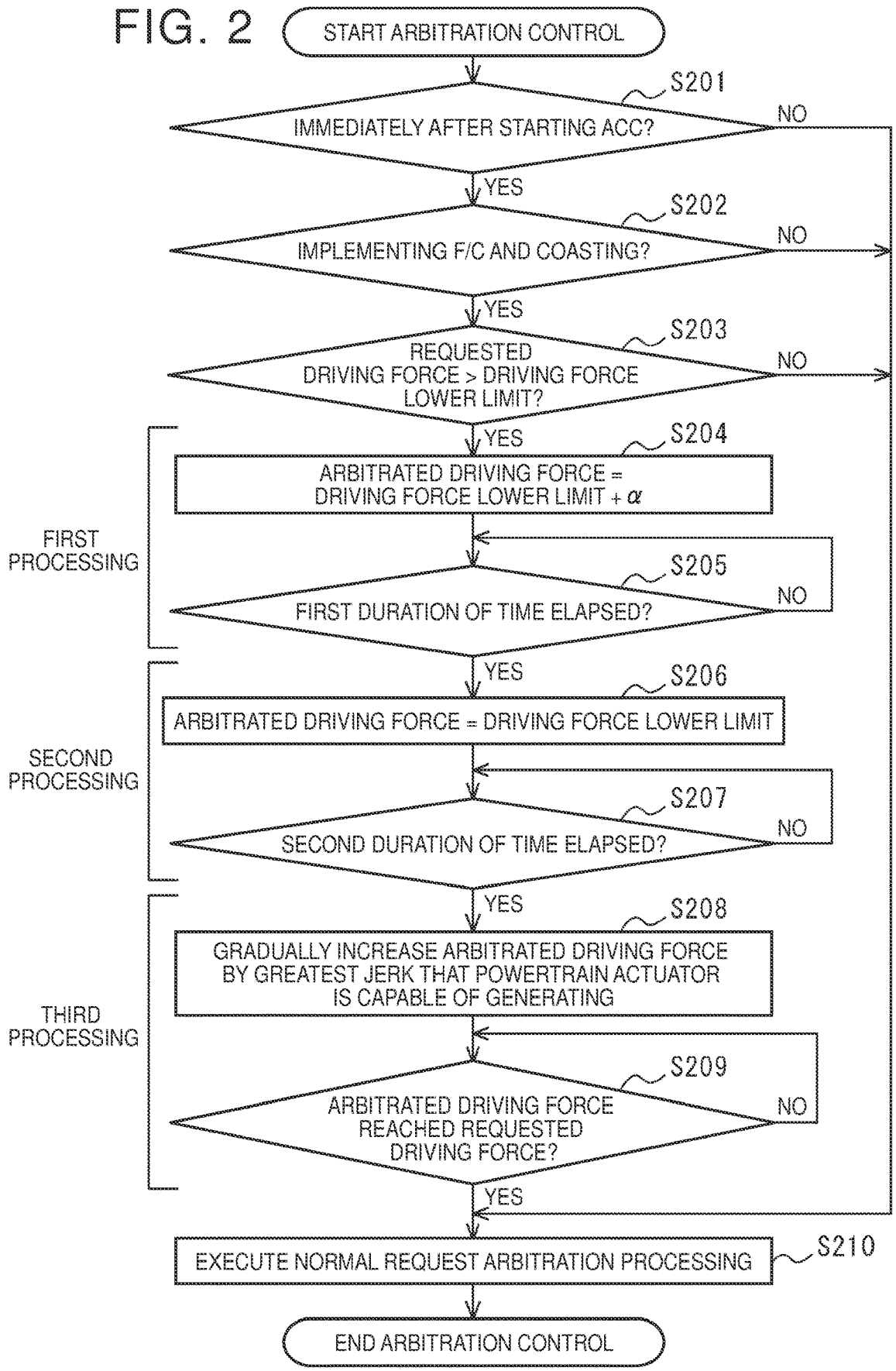
FIG. 2 is a flowchart showing processing procedures for arbitration control executed by an arbitrating unit of the control device.
Figure 3:
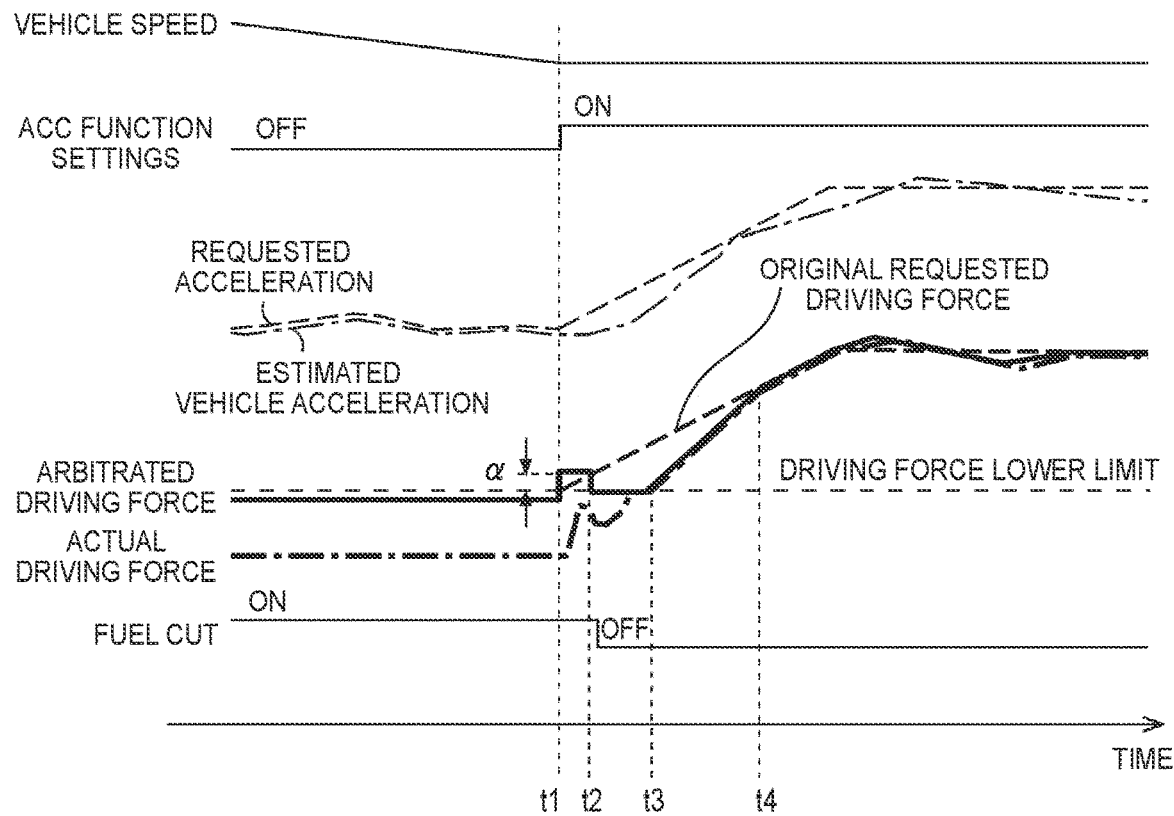
FIG. 3 is a timing chart showing the arbitration control executed by the control device according to the embodiment.

Arbitration control executed by the control device 10 according to the present embodiment will be described with reference to FIGS. 2 and 3 as well. FIG. 2 is a flowchart showing processing procedures for arbitration control that is executed by the arbitrating unit 12 of the control device 10. FIG. 3 is a timing chart showing arbitration control executed by the arbitrating unit 12.

The arbitration control shown in FIG. 2 is started upon the accepting unit 11 of the control device 10 accepting a first request (acceleration request) from the driving assistance system 20.

Step S201

The arbitrating unit 12 determines whether the current state is immediately after starting ACC. That is to say, the arbitrating unit 12 determines whether the processing is regarding a first request accepted from the driving assistance system 20 for the first time after the ACC function is set to an on state (from off to on). When determining that the current state is immediately after starting ACC (YES in step S201), the processing advances to step S202, and when determining that the current state is not immediately after starting ACC (NO in step S201), the processing advances to step S210.

Step S202

The arbitrating unit 12 determines whether the vehicle is in a state of implementing fuel cut (F/C) and also is coasting. Whether the vehicle is implementing F/C and also is coasting can be determined from signals indicating the speed of the vehicle, deceleration, operation amount of the accelerator pedal, operation amount of the brake pedal, the on/off state of F/C, and so forth. When determining that F/C is implemented and the vehicle is coasting (YES in step S202), the processing advances to step S203, and when determining that the state is not a state in which both F/C is implemented and the vehicle is coasting are true (NO in step S202), the processing advances to step S210.

Step S203

The arbitrating unit 12 determines whether the originally-requested driving force obtained by arbitration of the first request accepted from the driving assistance system 20 (hereinafter referred to as "requested driving force") exceeds the driving force lower limit (availability lower limit) of the powertrain actuator 31. The driving force is obtained by converting acceleration. When determining that the requested driving force exceeds the driving force lower limit (YES in step S203), the processing advances to step S204, and when determining that the requested driving force does not exceed the driving force lower limit (NO in step S203), the processing advances to step S210.

In the arbitration control of the present embodiment, determination is made that there is a possibility of the driveshaft twisting and causing vibrations and sound when the determinations in steps S201 through S203 are all affirmative, and the processing of step S204 and thereafter is executed.

Step S204

The arbitrating unit 12 sets a first driving force that is a driving force obtained by adding a predetermined driving force α to the driving force lower limit (availability lower limit) of the powertrain actuator 31, as the driving force to be output as arbitration results (hereinafter referred to as "arbitrated driving force"). That is to say, the first driving force (driving force lower limit+α) is set as the arbitrated driving force, instead of the original requested driving force. This driving force α is set to an optional magnitude at which fuel-cut recovery (from on to off) can be performed by requesting the powertrain actuator 31 for the first driving force (e.g., α=5 N), based on the capabilities of the powertrain actuator 31 and setting conditions for fuel cut, and so forth. When the first driving force is set to the arbitrated driving force, the processing advances to step S205.

Step S205

The arbitrating unit 12 determines whether a first duration of time has elapsed from setting the first driving force (driving force lower limit+α) as the arbitrated driving force. This determination is made in order to determine that the powertrain actuator 31 has received the request for the first driving force and that control has actually been performed. Accordingly, the first duration of time is set to be a duration of time necessary for communication from the control device 10 to the actuator system 30 (first cycle of communication) or longer (e.g., 25 ms). After awaiting for the first duration of time to elapse (YES in step S205), the processing advances to step S206.

Step S206

The arbitrating unit 12 sets the driving force of the driving force lower limit (availability lower limit) of the powertrain actuator 31 as the arbitrated driving force. That is to say, the arbitrating unit 12 lowers the arbitrated driving force from the first driving force (driving force lower limit+α) to the driving force lower limit. In the present arbitration control, execution of fuel cut recovery (from on to off) is awaited in this state in which the arbitrated driving force is set to the driving force lower limit. Upon the driving force lower limit being set to the arbitrated driving force, the processing advances to step S207.

Step S207

The arbitrating unit 12 determines whether a second duration of time has elapsed from setting the driving force lower limit to the arbitrated driving force. This determination is made in order to stand by until fuel cut recovery (from on to off) is executed. Accordingly, the second duration of time is set to be a duration of time necessary for fuel cut recovery to be executed with surety (e.g., 250 ms) or longer, based on output of the first driving force (driving force lower limit+α). After awaiting for the second duration of time to elapse (YES in step S207), the processing advances to step S208.

Step S208

The arbitrating unit 12 sets a driving force, in which the driving force lower limit is gradually increased by the greatest jerk that the powertrain actuator 31 is capable of generating, as the arbitrated driving force. Setting the arbitrated driving force with such a jerk restriction enables the arbitrated driving force, and hence the actual driving force of the vehicle, to be gradually made to approximate the original requested driving force. Once the arbitrated driving force with the jerk restriction is set, the processing advances to step S209.

Step S209

The arbitrating unit 12 determines whether the arbitrated driving force has reached the original requested driving force. After awaiting for the arbitrated driving force to reach the original requested driving force (YES in step S209), the processing advances to step S210.

Step S210

The arbitrating unit 12 executes normal request arbitration processing in which the first requests are arbitrated. Thus, the present arbitration control ends.

Note that in the present arbitration control described above, when a predetermined cancel event occurs, such as cancelling ACC settings, the processing transitions to the normal request arbitration processing of step S210, regardless of which processing of steps S201 to S209 is being executed.

Also, in the present arbitration control described above, a point in time immediately after starting the ACC function is determined in step S201 above, in order to determine a scene in which there is a possibility of the driveshaft twisting and causing vibrations and sound with a high level of precision, but this determination may be omitted. Further, when the vehicle is known in advance to be coasting when fuel cut (F/C) is in an on state, the determination of whether coasting in step S202 above can be omitted.

An example of processing based on the arbitration control described above will be described with reference to FIG. 3. In FIG. 3, prior to time t1, the ACC function is off, fuel cut is on, the vehicle is in a coasting state, and arbitrated driving force and actual driving force corresponding to the requested driving force are generated. After the ACC function turns on at time t1, from time t1 to time t2 the first driving force (driving force lower limit+α) is output and fuel cut recovery is requested (first processing in steps S204 and S205). Thereafter, actual execution of fuel cut recovery is awaited, from time t2 to time t3 (second processing in steps S206 and S207). Subsequently thereafter, the driving force lower limit is gradually increased by the greatest jerk, and the arbitrated driving force and the actual driving force are made to follow the requested driving force (third processing in steps S208 and S209). By executing the first processing, the second processing, and the third processing, in sequence, twisting of the driveshaft causing vibrations and sound to occur can be suppressed, and deviation between acceleration requested by the driving assistance system 20 and estimated vehicle acceleration can be suppressed.

Figure 4:
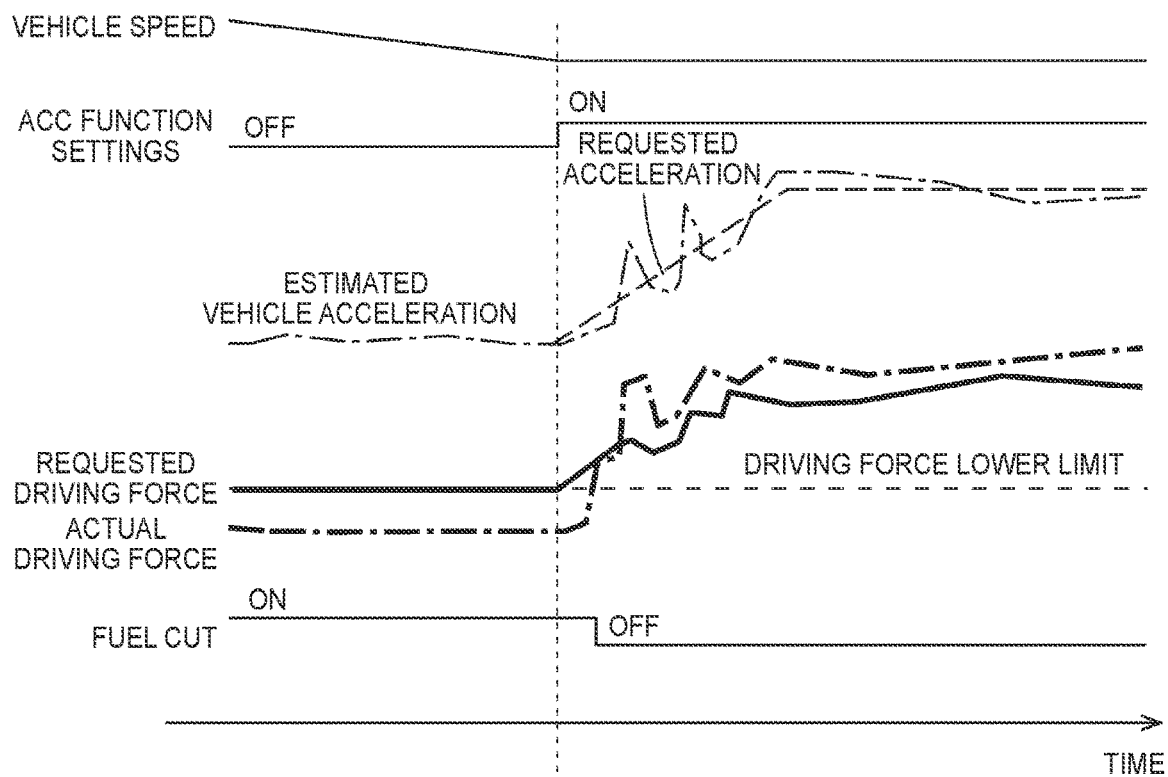
FIG. 4 is a timing chart showing arbitration control executed by a conventional control device.

FIG. 4 shows an example of processing based on conventional arbitration control, for comparison. As shown in FIG. 4, in conventional arbitration control after fuel cut recovery, a request is made to the powertrain actuator for rapid generation of a large driving force, in which the driving force of the arbitration results and the driving force accompanying the fuel cut recovery are superimposed, causing the driveshaft to twist (great deviation between requested acceleration and estimated vehicle acceleration) and generate vibrations and sound.

Effects and Advantages

As described above, when there is the first request from the driving assistance system 20 requesting driving force exceeding the first driving force (driving force lower limit of the powertrain actuator 31+α) necessary for fuel cut recovery, while implementing fuel cut and also coasting, the control device 10 according to an embodiment of the present disclosure arbitrates the request so as to be no greater than the first driving force until the actual driving force of the vehicle reaches the driving force lower limit.

According to this arbitration control, no request for driving force exceeding the driving force lower limit is generated until the actual driving force of the vehicle begins to follow the driving force lower limit of the powertrain actuator 31, and accordingly twisting of the driveshaft causing vibrations and sound can be suppressed.

As one example, there are cases in which, in a state of strong engine braking, such as in a state in which a vehicle is coasting and decelerating, and also is implementing fuel cut, for example, the control device 10 accepts the first request, which requires fuel cut recovery, from the driving assistance system 20. In the arbitration control according to the present embodiment, in such a case, the control device 10 does not output to the actuator system 30 the requested driving force that is the arbitration results of the request accepted from the driving assistance system 20 unchanged, and accordingly a great driving force in which the requested driving force and the driving force accompanying the fuel cut recovery are superimposed is not requested to the powertrain actuator 31. Accordingly, a large driving force is not rapidly generated by the powertrain actuator 31, and thus twisting of the driveshaft causing vibrations and sound can be suppressed.

Although an embodiment of the technology according to the present disclosure has been described above, the present disclosure is not limited to a control device, and can be understood as a control method executed by a control device provided with a processor and memory, a control program, a computer-readable non-transitory storage medium storing a control program, a manager, a vehicle provided with a control device, and so forth. For example, an aspect of the present disclosure relates to a manager installed in a vehicle, the manager comprising: an accepting unit that accepts a plurality of kinematic plans from a plurality of advanced driving-assistance system applications; an arbitrating unit that arbitrates the kinematic plans; a calculating unit that calculates a motion request based on arbitration results by the arbitrating unit; and a distributing unit that distributes the motion request to at least one of a plurality of actuator systems, wherein when there is the kinematic plan requesting a driving force exceeding a first driving force necessary for recovery from a fuel cut state, the arbitrating unit performs arbitration such that an actual driving force generated by the vehicle is no greater than the first driving force, until reaching a driving force lower limit realizable by a powertrain actuator included in the actuator system at a current gear ratio.

The present disclosure is useful in a control device installed in a vehicle or the like.

What is claimed is:

1. A control device installed in a vehicle, the control device comprising an electronic control unit configured to:
   accept a plurality of first requests from a driving assistance electronic control unit;
   arbitrate the first requests;
   calculate a second request that is a physical amount that differs from the first requests based on a result of arbitration in which the first requests are arbitrated; and
   distribute the second request to at least one actuator system of a plurality of actuator systems, wherein
   when the electronic control unit determines that the first request requesting a driving force exceeds a first driving force necessary for recovery from a fuel cut state, the electronic control unit performs arbitration such that an actual driving force generated by the vehicle is no greater than the first driving force, until reaching a driving force lower limit realizable by a powertrain actuator included in an actuator system of the plurality of actuator systems at a current gear ratio.

2. The control device according to claim 1, wherein the electronic control unit is configured to, when there is the first request requesting a driving force exceeding the first driving force, set an arbitrated driving force that is a driving force output as arbitration results to the first driving force, until the actual driving force of the vehicle reaches the driving force lower limit of the powertrain actuator.

3. The control device according to claim 2, wherein the electronic control unit is configured to, following maintaining the arbitrated driving force at the first driving force for a first duration of time, set the arbitrated driving force to the driving force lower limit of the powertrain actuator.

4. The control device according to claim 3, wherein the electronic control unit is configured to, following maintaining output of the driving force lower limit for a second duration of time, increase, by a prescribed jerk, a driving force output as arbitration results to a requested driving force that is a result of arbitration of the first requests.

5. A manager installed in a vehicle, the manager comprising:
   an electronic control unit that is configured to:
      accept a plurality of kinematic plans from a plurality of advanced driving-assistance system applications;
      arbitrate the plurality of kinematic plans;
      calculate a motion request based on arbitration results; and
      distribute the motion request to at least one actuator system of a plurality of actuator systems, wherein
   in response to a kinematic plan of the plurality of kinematic plans requesting a driving force exceeding a first driving force necessary for recovery from a fuel cut state, the electronic control unit performs arbitration such that an actual driving force generated by the vehicle is no greater than the first driving force, until reaching a driving force lower limit realizable by a powertrain actuator included in an actuator system of the plurality of actuator systems at a current gear ratio.

6. A control method executed by a computer of a manager installed in a vehicle, the control method comprising:
   accepting a plurality of kinematic plans from a plurality of ADAS applications;
   arbitrating the plurality of kinematic plans;
   calculating a motion request based on arbitration results from the arbitrating; and
   distributing the motion request to at least one actuator system of a plurality of actuator systems, wherein
   in response to a kinematic plan of the plurality of kinematic plans requesting a driving force exceeding a first driving force necessary for recovery from a fuel cut state, in the arbitrating, arbitration is performed such that an actual driving force generated by the vehicle is no greater than the first driving force, until reaching a driving force lower limit realizable by a powertrain actuator included in an actuator system of the plurality of actuator systems at a current gear ratio.

7. A non-transitory computer-readable storage medium storing a program that is executable by a computer of a manager installed in a vehicle and that causes the computer to perform functions comprising:
   accepting a plurality of kinematic plans from a plurality of ADAS applications; and
   arbitrating the plurality of kinematic plans;
   calculating a motion request based on arbitration results from the arbitrating;
   distributing the motion request to at least one actuator system of a plurality of actuator systems, wherein
   in response to a kinematic plan of the plurality of kinematic plans requesting a driving force exceeding a first driving force necessary for recovery from a fuel cut state, in the arbitrating, arbitration is performed such that an actual driving force generated by the vehicle is no greater than the first driving force, until reaching a driving force lower limit realizable by a powertrain actuator included in an actuator system of the plurality of actuator systems at a current gear ratio.

8. A vehicle, wherein the control device according to claim 1 is installed.

* * * * *